Patented Jan. 17, 1950

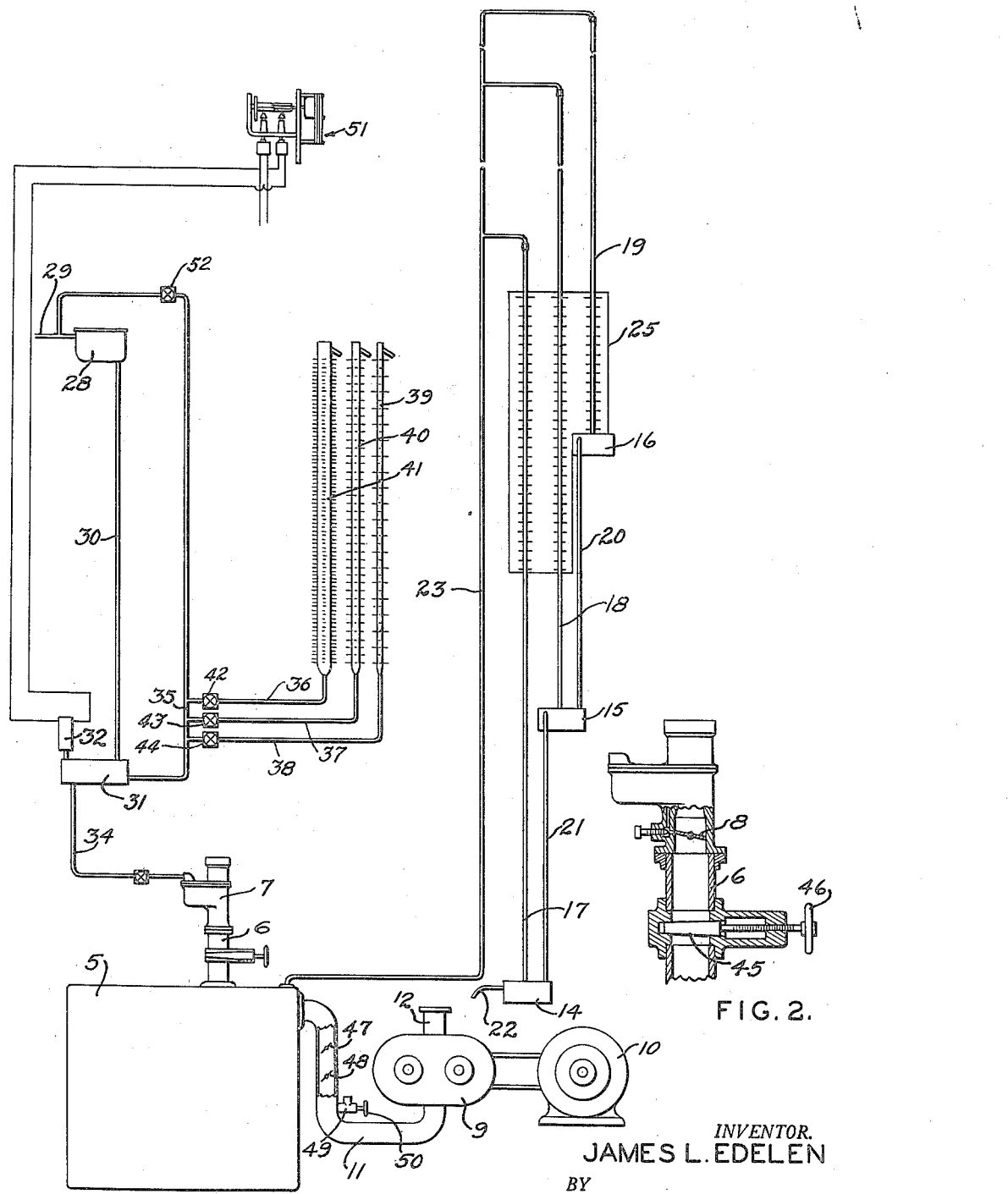

2,494,936

UNITED STATES PATENT OFFICE 2,494,936

CARBURETOR TESTING DEVICE AND METHOD

James L. Edelen, Kirkwood, Mo., assignor to Carter Carburetor Corporation, St. Louis, Mo., a corporation of Delaware Application July 8, 1944, Serial No. 544,058

5 Claims. (Cl. 73—118)

This invention relates to methods and means for flow testing carburetors for internal combustion engines.

The most accurate method of flow testing carburetors involves measuring the quantities of fuel and air entering the carburetor and forming the mixture discharged thereby. Such devices, method, and the necessary equipment, while being essential and feasible in the laboratory where skilled operators are available, are not practical for the repair shop because of their intricacy and cost and the skill required to utilize them. While it is possible to rather easily measure the rate of fuel flow, the measurement of the air component is more difficult. If the throttle valves in carburetors were made to accurately fit the carburetor barrels, the air flow could be determined at any given throttle position from a reading of the depression posterior to or down stream of the throttle since the rate of fluid flow through a restriction is proportional to the cross sectional area of the restriction and the difference of pressure on opposite sides thereof. The throttle valve constitutes a variable restriction in the carburetor mixture conduit. However, manufacturing inaccuracies prevent the use of this method, since in different carburetors of the same type appreciably varying leakages occur past the throttle when fully closed, so that a given depression posterior to the throttle, would not necessarily accompany the same throttle position, and, consequently, air flow.

It is an object of the present invention to provide a method and means of flow testing carburetors so as to compensate for, or avoid the results of the above mentioned manufacturing inaccuracies.

A more detailed object is to provide such a method and means for insuring that a predetermined suction posterior to the throttle will always accompany a predetermined and definite angular position of the throttle.

Still another detailed object is to provide means to accurately adjust the range of depressions posterior to the throttle, between the closed and full throttle positions, so that the depression has a direct relationship to the degree of throttle opening and rate of air flow.

These objects and other more detailed objects hereafter appearing are attained substantially by the device illustrated in the accompanying drawing in which Fig. 1 is a generally diagrammatic view illustrating the flow testing apparatus for performing the novel method.

Fig. 2 is enlarged detail section showing the carburetor mounting connection and the gate valve therein.

The apparatus in the drawing comprises a vacuum box 5 having a mounting or connection 6 projecting there above and flanged for attachment of a carburetor, as at 7, having a manual throttle valve 8. A suction pump 9, driven by a motor 10, has its inlet pipe 11 connected to the vacuum box and has an outlet pipe 12 for discharge to the atmosphere. The depression in box 5 is measured by a triple tube manometer including the liquid containers 14, 15 and 16, each vented to the atmosphere and into each of which extends one of the tubes 17, 18 or 19. Overflow ducts 20 and 21 connect the two higher containers with the lowest which later has an overflow drain 22. All of the manometer tubes are connected by a tube 23 to the suction box so that the depression therein will register simultaneously in all three manometer tubes. A scale board 25 is mounted behind tubes 17, 18 and 19 in such position as to indicate a liquid level in the upper part of tube 17, in the intermediate part of tube 18, and in the lower part of tube 19. Tubes 17, 18, and 19 are long enough to prevent drawing of the indicating liquid into the suction box. Scale board 25 is placed in a position conveniently aligned with the operator's eyes so that the highest suctions may be read from tube 17 and successively lower suctions from tubes 18 and 19. This arrangement is advantageous since it permits the use of a relatively inexpensive and sensitive manometer fluid such as water or other liquid substantially lighter than mercury. Another convenient form of manometer for this purpose is disclosed and claimed in my Patent No. 2,445,943.

An elevated constant level chamber 28 is connected by a tube 29 to a fuel pump or fuel tank and by means of a tube 30 to a three way valve 31 controlled by a solenoid 32. One conduit 34 from the three way valve is connected to the carburetor fuel inlet connection. The other conduit 35 extends to the inlet side of float bowl 28 and has three branches 36, 37 and 38 each connected to one of the burettes, 39, 40 and 41 provided with scale markings, as shown, and each having a control valve, as at 42, 43 and 44. Conduit 35 is controlled by a valve 52 which is opened to rapidly fill the burettes. As best shown in Fig. 2, carburetor mounting connection 6 is provided with a gate valve 45 having an operating handle 46 which is adapted to tightly close the connection when desired. A pair of butterfly valves 47 and 48 are located in vacuum pump connection 11 for controlling the same. A T fitting 49 provides means for bleeding air into connection 11 and is controlled by a valve through an actuating handle 50.

Solenoid 32 which controls three way valve 31 is itself controlled by a timer device, generally indicated at 51 and more fully disclosed and claimed in my Patent No. 2,441,402. This timer is manually controlled to cause feeding of fuel for a definite time through the carburetor from one or another of the burettes 39, 40 or 41, according to which valve 42, 43 or 44 is open. The different burettes provide for carburetors of different sizes and fuel requirements.

To set the apparatus for flow testing a particular carburetor, gate valve 45 is first tightly closed and, with the suction pump operating, the depression in box 5 is adjusted by fully opening valves 47 and 48 and varying the air bleeding through T fitting 49. This starting setting, as read on manometer tube 17, is adjusted to conform to a predetermined maximum reading, say, equivalent to 8″ of mercury. The gate valve is then fully opened as is the carburetor throttle 8, and the vacuum box depression again adjusted by means of one of the butterfly valves 47 or 48 to a predetermined minimum value, say, 1.3″ Hg, as read on manometer tube 19. Thereafter, the depression or suction in the box and the rate of air flow through the carburetor will vary inversely with the degree of opening of the throttle valve irrespective of initial leakage around the closed throttle with the gate valve open. To test or "flow" the carburetor, timer 51 is operated to adjust the three-way valve 31 to close the connection between tubes 30 and 34 and to permit flow from tube 35 and the burette to tube 34 and the carburetor. Only one of the burette valves 42, 43, and 44 will be opened in accordance with the capacity of the carburetor. The functioning of the carburetor at any suction compared to that of a carburetor in good condition, can be accurately determined merely by measuring the rate of fuel flow at that suction as read on one of the manometers. This is so because with a given depression in the vacuum box, the rate of air flow through the carburetor and any other similar carburetor will always be the same so that the factor of air flow may be ignored in a comparison between two carburetors of identical design. At the end of the test, the timer cuts off the connection between tubes 35 and 34 so that the quantity of gasoline used can be read from the burette in use.

Thus a reference chart can be provided indicating the proper rate of fuel flow at various suctions with the assurance that the proportions of fuel and air supplied will be proper if the rate of fuel flow conforms. This would be impossible without the gate valve 45, since in production carburetors, the throttle valve does not accurately fit the carburetor bore so that there is a variable amount of leakage around the throttle in its closed position and the suction may vary in different carburetors with their throttles in the same apparent position. If the maximum or starting depression in the vacuum box were set merely by closing the carburetor throttle, a given depression in the vacuum box would not accurately reflect a particular throttle position and, consequently, rate of air flow.

The maximum and minimum depression figures used in setting the apparatus preferably are determined to utilize the full lengths of the manometer tubes and thus obtain maximum sensitivity. These do not need to bear any particular relationship to actual working conditions as the test is solely comparative and designed to indicate only whether the instrument being tested needs repair.

By the use of a novel apparatus and method as described above, it is possible for the mechanic in an ordinary repair shop to accurately determine the functioning of a carburetor at various throttle positions and he may, therefore, feel assured either that the carburetor needs repair or that his work has been successful.

The invention may be modified in various respects as will occur to those skilled in the art and the exclusive use of all modifications as come within the scope of the appended claims is contemplated.

I claim:

1. The method of flow testing a carburetor having a throttle which consists in attaching the carburetor to a suction chamber and a measured fuel supply, closing the connection between the carburetor and chamber, applying a predetermined maximum suction to the chamber, opening the connection between the carburetor and chamber so as to draw air through the carburetor, setting the chamber suction at a predetermined minimum with the carburetor throttle fully open, and then determining the rate of fuel flow through the carburetor at various predetermined throttle settings.

2. The method of flow testing a carburetor having a throttle which consists in connecting the carburetor to a chamber having a suction pump also connected thereto, tightly closing the connection between the chamber and carburetor, evacuating the chamber with the suction pump, adjusting the chamber depression to a predetermined maximum by bleeding air thereinto, opening the carburetor throttle and the connection between the chamber and carburetor so as to draw full volume of air through the carburetor, valving the connection between the chamber and pump to adjust the chamber depression to a predetermined minimum, feeding fuel to the carburetor, and measuring the rate of fuel flow at various known throttle positions.

3. The method of flow testing a carburetor which consists in connecting the carburetor and a suction pump to a suction chamber, reducing the pressure in said chamber tightly closing the connection between the carburetor and chamber, bleeding air into the chamber to adjust the depression therein to a predetermined maximum, opening said connection and the carburetor throttle so as to draw a maximum volume of air through the carburetor, restricting the connection between the chamber and pump to adjust the chamber depression to a predetermined minimum, feeding fuel to the carburetor, and measuring the rate of fuel flow at various predetermined, restricting throttle positions.

4. The method of flow testing a carburetor which consists in connecting the carburetor outlet to a chamber also having a suction pump connected thereto, tightly closing the connection between the carburetor and chamber, operating the pump, bleeding air into the pump connection to adjust the chamber depression to a predetermined maximum starting value, fully opening the carburetor throttle and the carburetor connection to the suction chamber, restricting the pump connection to the chamber to adjust the chamber depression to a predetermined minimum whereby the chamber depression is exactly proportional to the degree of throttle opening, and measuring the rate of fuel flow at various known throttle positions.

5. A flow test machine for carburetors comprising a vacuum chamber having a carburetor mounting connection, means to indicate the depression in said chamber, a valve in said connection for tightly closing the same, a suction pump having a connection to said chamber, an air bleed in said pump connection for adjusting the chamber depression with said valve closed, a valve in said pump connection for adjusting the chamber depression with said first valve and the carburetor throttle fully open, and a fuel flow meter for feeding measured quantities of fuel to the carburetor.

JAMES L. EDELEN.

REFERENCES CITED

The following references are of record in the file of this patent:

UNITED STATES PATENTS

| Number | Name | Date |
|---|---|---|
| 1,962,174 | Christman | June 12, 1934 |
| 2,073,243 | Liddell et al. | Mar. 9, 1937 |
| 2,209,212 | Sturm et al. | July 23, 1940 |
| 2,303,532 | Ewart et al. | Dec. 1, 1942 |
| 2,310,974 | Lumm | Feb. 16, 1943 |

FOREIGN PATENTS

| Number | Country | Date |
|---|---|---|
| 428,843 | Great Britain | Aug. 14, 1933 |
| 432,872 | Great Britain | Nov. 1, 1933 |